United States Patent
Amir et al.

(10) Patent No.: US 10,254,563 B2
(45) Date of Patent: Apr. 9, 2019

(54) METHOD FOR DETERMINING AN OPHTHALMIC LENS COMPRISING AN ASPHERICAL CONTINUOUS LAYER ON ONE OF ITS FACES AND AN ASPHERICAL FRESNEL LAYER ON ONE OF ITS FACES

(71) Applicant: Essilor International, Charenton le Pont (FR)

(72) Inventors: Bruno Amir, Charenton le Pont (FR); Pauline Colas, Charenton le Pont (FR); Mélanie Tessieres, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 443 days.

(21) Appl. No.: 14/436,804

(22) PCT Filed: Oct. 17, 2013

(86) PCT No.: PCT/EP2013/071790
§ 371 (c)(1),
(2) Date: Apr. 17, 2015

(87) PCT Pub. No.: WO2014/060552
PCT Pub. Date: Apr. 24, 2014

(65) Prior Publication Data
US 2015/0253586 A1   Sep. 10, 2015

(30) Foreign Application Priority Data
Oct. 18, 2012   (EP) ..................... 12290354

(51) Int. Cl.
*G02C 7/02* (2006.01)
*G02C 7/06* (2006.01)

(52) U.S. Cl.
CPC ............. *G02C 7/028* (2013.01); *G02C 7/022* (2013.01); *G02C 7/024* (2013.01); *G02C 7/066* (2013.01); *G02C 7/068* (2013.01); *G02C 2202/20* (2013.01)

(58) Field of Classification Search
CPC ........ G02C 7/028; G02C 7/022; G02C 7/024; G02C 7/066; G02C 7/068; G02C 2202/20
(Continued)

(56) References Cited

U.S. PATENT DOCUMENTS 4,340,283 A    7/1982  Cohen

FOREIGN PATENT DOCUMENTS

DE    23 12 872      9/1974
EP    0 276 331      8/1988
(Continued)

OTHER PUBLICATIONS

PCT international search report for the instant application.*
PCT written opinion for the instant application.*
Greten, R., "Lens Plate", DE2312872, machine translation.*

*Primary Examiner* — Bumsuk Won
*Assistant Examiner* — Wen Huang
(74) *Attorney, Agent, or Firm* — Oblon, McClelland, Maier & Neustadt, L.L.P.

(57) ABSTRACT

Method for defining one face of an ophthalmic lens, having a surface formed by superposing a Fresnel layer and a continuous surface referred to as the "carrier". Also disclosed is an ophthalmic lens comprising such a face. The method allows a Fresnel layer to be defined that compensates for geometric effects induced by a variation in the curvature of the carrier on the light incident on the face of an ophthalmic lens. This method is particularly useful when the curvature of the face of the ophthalmic lens is adapted to facilitate fitting it into a spectacle frame.

7 Claims, 2 Drawing Sheets

(58) Field of Classification Search
USPC .................................................. 351/159.42
See application file for complete search history.

(56) References Cited

FOREIGN PATENT DOCUMENTS

| | | |
|---|---|---|
| EP | 0 368 751 | 5/1990 |
| FR | 2 623 921 | 6/1989 |
| JP | 47-48464 | 8/2011 |

* cited by examiner

Fig.2

METHOD FOR DETERMINING AN OPHTHALMIC LENS COMPRISING AN ASPHERICAL CONTINUOUS LAYER ON ONE OF ITS FACES AND AN ASPHERICAL FRESNEL LAYER ON ONE OF ITS FACES

RELATED APPLICATIONS

This is a U.S. National Phase Application under 35 USC 371 of International Application PCT/EP2013/071790 filed on Oct. 17, 2013.

This application claims the priority of European application no. 12290354.5 filed Oct. 18, 2012, the entire content of which is hereby incorporated by reference.

FIELD OF THE INVENTION

One of the subjects of the present invention is a method for defining one face of an ophthalmic lens, having a surface formed by superposing a Fresnel layer and a continuous surface referred to as the "carrier". The invention also relates to an ophthalmic lens comprising such a face. The present invention also relates to a computer software package comprising a series of instructions that when loaded into a computer lead to the execution, by said computer, of the steps of a method according to the invention. The invention furthermore provides a computer-readable medium storing a series of instructions of the computer software package.

The method according to the invention allows a Fresnel layer to be defined that compensates for geometric effects induced by a variation in the curvature of the carrier on the light incident on said face. This method is particularly useful when the curvature of the face of the ophthalmic lens is adapted to facilitate fitting in a spectacle frame.

BACKGROUND OF THE INVENTION

This section is intended to introduce the reader to various aspects of the art, which may be related to various of the aspects of the present invention that are described and/or claimed below. This discussion is considered to be worthwhile as it provides background information that will make it easier for the reader to understand the different aspects of the present invention. Thus, it will be understood that these statements must be read in this light and that they are not intended to distinguish the prior art.

Any ophthalmic lens, intended to be fitted in a frame, is associated with a prescription. The ophthalmic prescription may comprise a prescription for a positive or negative power and a prescription for astigmatism. These prescriptions correspond to corrections to be made to the eyes of the wearer of the lenses to correct for defects in his vision. A lens is fitted in the frame depending on the position of the eyes of the wearer relative to the frame.

In the simplest cases, the prescription only prescribes a positive or negative power and optionally an astigmatism, and the lens is then said to be "unifocal". When the prescription does not comprise an astigmatism, the lens is axisymmetric. It is simply fitted in the frame so that the main direction of the gaze of the wearer coincides with the axis of symmetry of the lens. For presbyopic wearers, the value of the power correction is different for far vision and near vision, because of difficulties with accommodation in near vision. The prescription is then composed of a far-vision power value and an addition (or power progression) representative of the power increment between far-vision and near-vision points; this boils down to a power prescription for far vision and a power prescription for near vision. Progressive multifocal lenses are lenses suitable for presbyopic wearers; these lenses are for example described in EP 2 249 195 B1 or EP 2 251 733 B1. Progressive multifocal ophthalmic lenses comprise a far-vision zone, a near-vision zone, an intermediate-vision zone and a main progression meridian passing through these three zones. These lenses are non-specific, in that they are tailored to the various actual needs of the wearer. Families of progressive multifocal lenses are defined, each lens of a family being characterized by an addition, which corresponds to the variation in power between the far-vision zone and the near-vision zone. More precisely, the addition, denoted A, corresponds to the variation in power on the meridian between an FV point in the far-vision zone and an NV point in the near-vision zone, these points being referred to as the far-vision reference point and the near-vision reference point, respectively, and representing the points of intersection of the gaze of the wearer and the surface of the lens when he is gazing to infinity and reading, respectively.

Conventionally, a lens may be defined by its base (or average far-vision sphere of its front face) and by a power addition in the case of a multifocal lens. From semi-finished lenses, only one face of which has been shaped with a given addition/base pair, it is possible to prepare lenses tailored to each wearer by simply machining a prescription face that is generally spherical or toroidal.

For any ophthalmic lens, the laws of optics explain the appearance of optical defects as the light rays get further from the central axis of the lens. These known defects, which comprise inter alio power defects and astigmatism defects, may be referred to generically as "ray obliqueness defects" Those skilled in the art know how to compensate partially for these defects. For example, EP-A-0 990 939 proposes a method for defining by optimization an ophthalmic lens for a wearer having an astigmatism prescription. Obliqueness defects have also been identified for progressive multifocal lenses. For example, WO-A-98 12590 describes a method for defining by optimization a set of multifocal ophthalmic lenses.

An ophthalmic lens comprises a central "optically useful" zone that may extend over the entirety of the lens. The expression "optically useful zone" is understood to mean a zone in which curvature and astigmatism defects have been minimized in order to obtain a satisfactory visual comfort for the wearer. In a progressive lens, the central optically useful zone covers at least the far-vision zone, the near-vision zone and the zone of progression.

Generally, the optically useful zone covers the entirety of the lens, which has a diameter of limited value. However, in certain cases, a "peripheral" zone is provided on the perimeter of the ophthalmic lens. This zone is said to be "peripheral" because it does not meet the conditions of the prescribed optical correction and contains large obliqueness defects. Provision must thus be made for a joint between the central optically useful zone and the peripheral zone.

There are mainly two situations in which an ophthalmic lens comprises such a peripheral zone. On the one hand, when the lens has a large diameter, which may be required by the shape of the frame, for example an elongate frame with a high face-form angle, and on the other hand, when the power prescription is high, the glass then having a large edge thickness or a large center thickness, which it would be desirable to decrease.

In the case of an ophthalmic lens intended to be tailored to a wrap-around frame, for example having a face-form angle of 15°, the lens has a front face with a high camber (i.e.

a high base) of between 6 diopters (denoted "D" below) and 10 diopters, and a back face specifically calculated to achieve optimal correction of the ametropia of the wearer at the optical center and in his field of vision. For example, for a front face having a given curvature, the back face is machined to ensure the correction depending on the ametropia of each wearer.

The high camber of the front face means that the lens is very thick at its edges in the case of a lens providing a negative power or is very thick at the center of the lens in the case of a lens providing a positive power. These large thicknesses increase lens weight, thereby decreasing wearer comfort and making them unattractive. In addition, for certain frames, edge thickness must be controlled in order to allow the glass to be fitted in the frame.

For negative lenses, edge thickness may be decreased by grinding using a manual faceting machine. The lens may also be controllably thinned by optical optimization. An asphericity or an atoricity may be calculated, for at least one of the faces of the lens, this asphericity or atoricity making allowance for the wear conditions of the lens relative to those of a low-camber lens of the same prescription, in order to allow the center and edge thicknesses of the highly cambered lens to be decreased.

Solutions employing such optical asphericities or atoricities have for example been described in documents U.S. Pat. Nos. 6,698,884, 6,454,408, 6,334,681, 6,364,481 or even WO-A-97 35224.

Moreover, in the case of a lens with a strong prescription, the trimmed lens has a large edge thickness, on the nasal side for a positive lens (case of a hypermetropic wearer) and on the temporal side for a negative lens (case of a myopic wearer). These excessive edge thicknesses make it difficult to fit the lens in its frame and makes wearing these lenses burdensome.

EP 2 028 529 A1 describes a method for defining the two faces of an ophthalmic lens taking into account the prescription, information on the position of the lens relative to the eyes of the wearer and information on the geometry of the frame in which the lenses must be fitted.

This first solution of the prior art proposes to tailor the curvature of the front face of an ophthalmic lens in order to improve the esthetics of the fit of the lens on the frame.

WO 2008/037892 describes a method for defining an ophthalmic lens comprising an optically useful zone, a zone, referred to as the "peripheral" zone, such as described above allowing the edge and/or center thickness of the lens to be decreased, and a joining zone possessing a profile of curvature optimized for the comfort of the wearer.

This prior-art solution proposes to decrease the edge and/or center thickness of ophthalmic lenses by producing a local asphericity or atoricity in one face of the lens, the other face being known, in order to facilitate fitting into a spectacle frame. The proposed solution provides for a joint between the central optically useful zone and the thinned peripheral zone. The prescription is respected only in the optically useful zone. This solution is not acceptable for each and every wearer because of the "peripheral" region in which his vision is not corrected.

The solutions proposed in the prior art do not allow problems posed by the esthetics of the fit of an ophthalmic lens in a frame and those posed by the need to fit ophthalmic lenses in a frame to be solved simultaneously.

In addition, there is still a need for a lens that better meets the demands of wearers with an optimal optical performance while having a small thickness in order to improve the esthetic appearance of the lens and the comfort of the wearer.

SUMMARY OF THE INVENTION

One object of the present invention is to facilitate the fitting of an ophthalmic lens in a spectacle frame, the lens being devoid of a "peripheral" and/or joining zone in which the power prescription is not or is only partially respected. To do this, one aspect of the invention proposes to superpose, on one face of an ophthalmic lens, a carrier and an aspherical Fresnel layer, the carrier having a profile of curvature that is constrained in order to make the lens easy to mount in a spectacle frame, and the aspherical Fresnel layer compensating for geometric effects induced by this modification.

For this purpose, one aspect of the invention relates to a method for defining one face of an ophthalmic lens, said face having a surface formed by superposing a Fresnel layer and a continuous surface referred to as the "carrier", said carrier comprising a geometric center, a first central zone and an annular peripheral zone, said carrier being axisymmetric, said Fresnel layer, the first central zone and the peripheral zone being centered on said geometric center, the first central zone being bounded by a first circular boundary, the peripheral zone being bounded on the one hand by a second circular boundary and on the other hand by the edge of the face, the method being implemented by computer and comprising a step of:

(S1) defining a first profile of curvature for said carrier in said first central zone and a second profile of curvature for said carrier in said peripheral zone;

(S10) defining a first radius for said first boundary and a second radius for said second boundary;

(S20) defining a third profile of curvature for a transitional zone of said carrier, said transitional zone being contiguous to the first central zone and to said annular peripheral zone, and defining a complete profile of curvature for the carrier, comprising said first, second and third profiles of curvature of the carrier;

(S30) defining a target profile of curvature for the face, said target profile of curvature being identical in said first central zone to the first profile of curvature of the carrier;

(S40) defining a continuous profile of curvature on the basis of a difference between said target profile of curvature and said complete profile of curvature of the carrier; and (S50) defining the Fresnel layer by cutting said profile of curvature.

Depending on the embodiment, the method for defining one face of an ophthalmic lens according to the invention may comprise one or more of the following features:

said first profile of curvature of the carrier has a first constant curvature in the first central zone and the target profile of curvature of the face has a constant curvature in the first central zone, the transitional zone and the peripheral zone, in which said constant curvature is equal to said first curvature.

said first profile of curvature of the carrier has a first constant curvature in the first central zone, said second profile of curvature of the carrier has a second constant curvature in the peripheral zone and the target profile of curvature of the face has in the peripheral zone a constant curvature.

the Fresnel layer comprising a plurality of rings centered on the geometric center, each ring being defined on the basis of the continuous profile of curvature and of a given ring height, the first radius and said ring height being defined so that the Fresnel layer is devoid of rings in a circular second central zone centered on said geometric center and of radius larger than or equal to 15 mm.

the third profile of curvature is defined so that the carrier has a representation that is continuously derivable up to the 4th order and so that the complete profile of curvature of the carrier has a representation that is continuously derivable up to the 4th order and so that the target profile of curvature of the face has a representation that is continuously derivable up to the 4th order.

the third profile of curvature is described by a 3rd-order polynomial equation as a function of the distance to the geometric center.

the second radius is defined so that the value of the second radius is lower than the value of the temporal capacity of said lens.

said face is a front face of the lens or a back face of the lens.

One advantage of the method according to an embodiment of the invention is due to the fact that the compensation of the variation in the curvature of the carrier is delivered by the face that comprises the carrier. Thus, if the carrier is placed on the front face of a semi-finished lens, the back face of the semi-finished lens remains available to be machined to the prescription (toroid, prism, progression, wear conditions, etc.) just like a conventional semi-finished lens. The machining of the back face is not modified.

Another aspect of the invention relates to an ophthalmic lens comprising a face, said face comprising a Fresnel layer and a carrier bearing said Fresnel layer, said carrier comprising a geometric center, a first central zone and an annular peripheral zone, said carrier being axisymmetric, said Fresnel layer, the first zone and the peripheral zone being centered on said geometric center, the first central zone being bounded by a first circular boundary, the peripheral zone being bounded on the one hand by a second circular boundary and on the other hand by the edge of the face, a first profile of curvature of the carrier in said first central zone having a first constant curvature, a second profile of curvature of the carrier in said peripheral zone having a second curvature different from the first curvature in at least one of its portions, the Fresnel layer comprising a plurality of rings centered on the geometric center.

According to an embodiment of the invention, the face comprises a second circular central zone centered on said geometric center, which zone is devoid of rings and has a radius larger than or equal to 15 mm, and all the points of the face that are located outside the first central zone have a constant curvature equal to said first curvature.

Depending on the embodiment, the ophthalmic lens comprising a face according to the invention may comprise one or more of the following features:

the rings of the Fresnel layer have an aspherical profile;
said face is a front face of the lens;
said lens is made to a negative prescription and is intended to be fitted in a frame of a pair of wrap-around spectacles;
said lens is made to a positive prescription and is intended to be fitted in a frame of a pair of conventional spectacles;
said lens is made to a very strongly positive prescription and is intended to be fitted in a frame of a pair of conventional spectacles;
said face is a back face of the lens; and
said lens is made to a very strongly negative prescription and is intended to be fitted in a frame of a pair of conventional spectacles.

Another aspect of the invention relates to a computer software package comprising a series of instructions that when loaded into a computer lead to the execution, by said computer, of the steps of a method according to the invention.

Another aspect of the invention relates to a computer readable medium storing a series of instructions of the computer software package.

Ophthalmic lenses according to an embodiment of the invention made to "conventional" prescriptions have, for a given prescription, the following advantages: their thickness and therefore weight are substantially decreased and they are easier to fit because the front face may be configured to have, at its periphery, a curvature that is substantially equal to that of the frame even when the frame is a wrap-around frame.

Furthermore, lenses according to an embodiment of the invention are optically continuous: the optically useful zone covers all of the lens. In other words, when wearing a lens according to the invention, the image seen by the wearer does not jump when the latter changes his gaze direction.

Although Fresnel surfaces are employed, known drawbacks of Fresnel surfaces are mitigated. For example, parasitic images caused by the Fresnel surfaces do not inconvenience the wearer when the Fresnel surfaces have a suitable arrangement in the lenses.

More specifically, 4 nonlimiting examples of particular, advantageous embodiments of the ophthalmic lens are given in brief below. Details of the methods used to define one face of these example ophthalmic lenses are also given below.

First advantageous embodiment: The case is considered of a finished ophthalmic lens having a positive prescription (base 8) and intended to be fitted in a conventional frame (base 4).

A conventional lens made to this prescription would be difficult to fit in such a frame because of the large difference between the curvature of the frame and that of the front face of the lens.

For a given prescription, a lens the front face of which is defined, by a method according to the invention, with a flattened peripheral zone (base 4) will be easier to fit into a rimmed frame because the curvature of the peripheral zone of the front face is defined to match that of the frame. It is also easier to fit the lens according to the invention into a rimless frame; in the latter case, the drilling of the lens is made easier by the lower curvature of the peripheral zone.

Second advantageous embodiment: the case is considered of a lens having a strongly positive prescription (base 13) and intended to be fitted in a conventional frame (base 4), said lens furthermore having a spherical back face.

In the case of a conventional lens, the diameter of the lens is very much smaller because of the high curvature of the front face, which means that the edges of the lens are a substantial thickness. The Applicant markets the OMEGA® lens, the design of which allows the diameter of the lens to be substantially increased, but at the expense of an inversion of curvature on the front face, which has the effect of restricting the field of view of the wearer.

For a given prescription, a lens the front face of which is defined by a method according to the invention and which therefore comprises a flattened peripheral zone (base 4) will be easier to fit for the same reasons as those described above. Relative to lenses of the prior art, the lens according to the invention will be larger in diameter and have an enlarged field of view.

Third advantageous embodiment: The case is considered of a lens having a negative prescription (base 4) and intended to be fitted in a cambered frame (base 8).

A conventional lens made to this prescription would be difficult to fit in such a frame because of the large difference between the curvature of the frame and that of the front face of the lens.

For a given prescription, a lens the front face of which is defined, by a method according to the invention, with a curved peripheral zone (base 8) will be easier to fit into a rimmed frame because the curvature of the peripheral zone is defined to match that of the frame. Moreover, a large range of prescriptions may be catered for by such lenses, said range possibly extending from −6 D to −8 D depending on the refractive index of the material of the lens.

Fourth advantageous embodiment: The case is considered of a lens having a front face with a conventional curvature (base 4) made to a strongly negative prescription (−10 D) and intended to be fitted in a conventional frame (base 4).

Such lenses generally have a substantial thickness at their edges; they are in general therefore smaller than 60 mm in diameter.

For a given prescription, a lens the back face of which is defined by a method according to the invention (i.e. by calculating a back-face carrier comprising a flattened peripheral zone (base 4)) has, for a given diameter, a smaller thickness at its edges, or, for a given edge thickness, a larger diameter.

BRIEF DESCRIPTION OF THE DRAWINGS

The invention will be better illustrated and understood by way of the nonlimiting embodiments and examples of their implementation given with reference to the appended figures, in which:

FIG. 1a shows a schematic cross-sectional view of one face of an ophthalmic lens defined by a method according to an embodiment of the invention;

FIG. 1b shows a schematic cross-sectional view of a Fresnel layer borne by a carrier of the face shown in FIG. 1a;

FIG. 1c shows a schematic cross-sectional view of the carrier of the face shown in FIG. 1a;

DETAILED DESCRIPTION OF THE DRAWINGS

It will be understood that the description of the present invention has been simplified in order to illustrate only those aspects relevant to a clear understanding of the present invention, many other aspects of methods for defining ophthalmic lens faces having been neglected for the sake of clarity. However, because they are well known in the prior art, a detailed discussion of these aspects is not provided here. The present disclosure is to be read bearing in mind all these variations and modifications known to those skilled in the art.

In the context of this patent application, the expression "ophthalmic lens" is understood to mean either a finished ophthalmic lens both faces of which have been shaped to correct the vision of a wearer under given wear conditions, or a semi-finished lens blank, a semi-finished lens blank comprising a finished face and a second face intended to be machined in order to form a finished ophthalmic lens such as described above. In this second situation, the finished face may be concave or convex and corresponds to the front face or back face of the future finished lens.

Figures 1A, 1B:
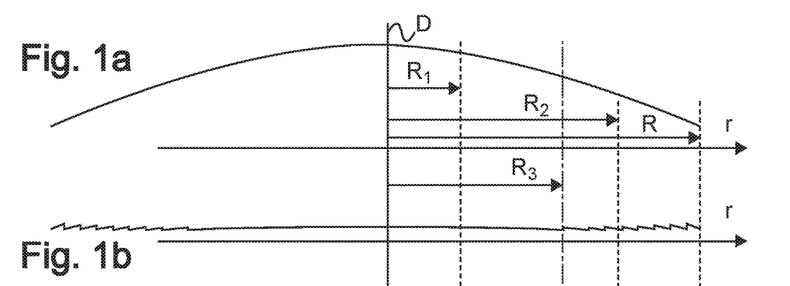
Figure 1C:
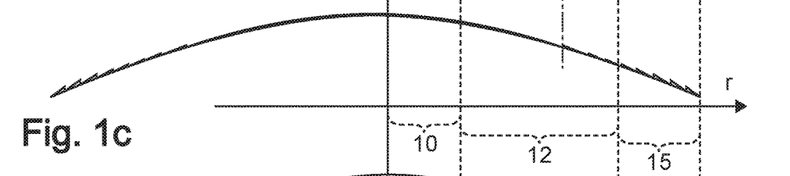

In the description of FIG. 1c, a radial cross-sectional view of one face of an ophthalmic lens is considered in an orthonormal coordinate system the abscissa r of which follows the direction of a radius of the lens, and the ordinate D of which passes through the geometric center of the face. This face may either be the front face of the lens, i.e. the face that is opposite the spectacle wearer (as illustrated above in the first three embodiments of the lens according to the invention), or the back face of the lens (as illustrated above in the fourth embodiment of the lens according to the invention).

The face of the lens according to the invention is defined by superposing an axisymmetric carrier (shown in the same orthonormal coordinate system in FIG. 1a) and an axisymmetric aspherical Fresnel layer (shown in the same orthonormal coordinate system in FIG. 1b). The aspherical Fresnel layer forms a microstructure produced by cutting an aspherical continuous layer and will be described below. The term "carrier" designates a continuous surface bearing the microstructure. At any point on the face of the lens, the height of the point along the axis D may be expressed as the algebraic sum of a height along the axis D of the continuous surface, and of a height along the axis D of the aspherical Fresnel layer.

Figure 1D:
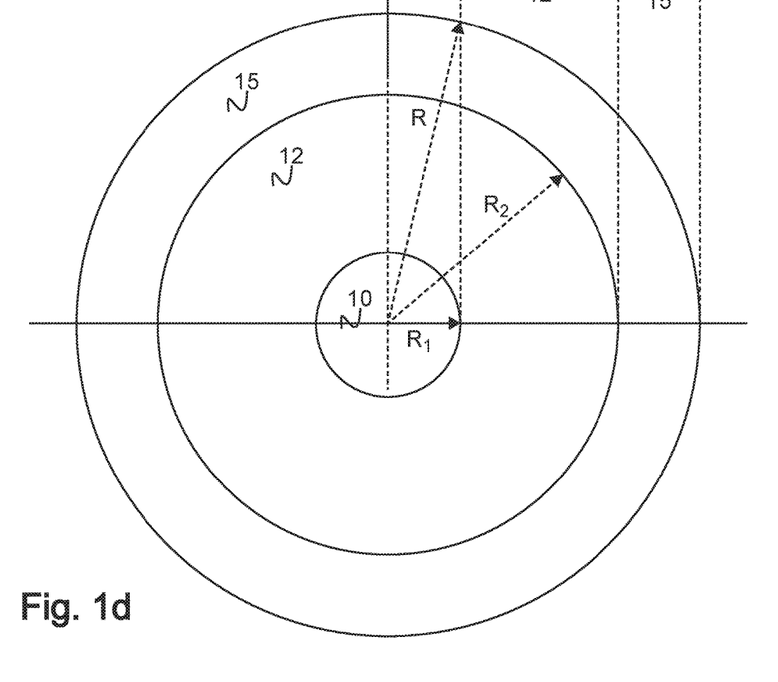
FIG. 1d shows a schematic top view of the carrier shown in FIG. 1c.

The carrier is shown from above in FIG. 1d and in cross section in FIG. 1c in the orthonormal coordinate system (r, D). The carrier is axisymmetric and is composed of three zones defined by their radii: a circular central zone 10; an annular peripheral zone 15 and a transitional zone 12 connecting the central zone 10 and the peripheral zone 15.

The surface of the carrier is continuously derivable up to the 4th order from a mathematical point of view. The transitional zone 12 of the carrier is in particular defined so as to enable this mathematical continuity and to ensure that the optical properties of the central zone 10 are not modified by the constraints imposed on the peripheral zone 15.

The three zones 10, 12 and 15 of the face are centered on the same point; preferably on the geometric center of the face comprising the carrier, in order to make it easier to produce the component microstructures of the Fresnel layer.

The three zones 10, 12 and 15 of the face have circular outlines. In FIG. 1d, the face has a circular edge of radius R and the central zone 10 is bounded by a first boundary that forms a circle of first radius R1. The peripheral zone 15 is bounded on the one hand by a second circular boundary of second radius R2 and on the other hand by the edge of the face. The transitional zone and the peripheral zone have annular shapes.

The dimensions of each zone are not fixed and may be set depending on the frame in which the ophthalmic lens is intended to be fitted and on the prescription. The central zone 10 is sufficiently large in size to ensure the field of view of the central vision of the wearer is devoid of rings. The width of the transitional zone 12 must be large enough to allow a geometric transition to be achieved between the profile of curvature of the first zone and the profile of curvature of the second zone, but also small enough for the annular peripheral zone 15 to be wide enough to allow its curvature to be satisfactorily matched to that of the frame in which the lens must be mounted.

In this context, the first radius R1 of the first boundary and the second radius R2 of the second boundary are considered. The transitional zone 12 then extends between an inside radius equal to the radius R1 of the first boundary and outside radius that corresponds to the radius R2 of the second boundary.

In FIG. 1c, the 3 zones of the carrier are indicated in the cross-sectional view of the carrier. Because the carrier is axisymmetric, the surface of the various zones of the carrier will be described below by way of their radial profile of curvature, i.e. on the curve resulting from a radial half-section.

The profile of curvature of the central zone 10 is referred to as the "first profile of curvature" and the profile of curvature of the peripheral zone 15 is referred to as the "second profile of curvature". The first and second profiles are known because they are imposed by prescription constraints and by the frame curvature constraints, respectively.

The profile of curvature of the transitional zone 12 is referred to as the third profile of curvature.

Advantageously, the third profile of curvature is described by a 3rd-order polynomial equation as a function of the radial distance to the axis of symmetry.

FIG. 1b shows a cross-sectional view of the Fresnel layer in the orthonormal coordinate system (r, D). The profile of the Fresnel layer is made up of microstructures (also referred to as "teeth") a representation of which seen from above would correspond to a succession of concentric rings. The Fresnel layer comprises a second central zone also centered on the geometric center of the carrier, which zone is devoid of teeth and has a radius R3 larger than or equal to 15 mm.

This radius of 15 mm corresponds to a zone of the lens encompassing the field of view of the central vision of a wearer, of +/−30° for a distance equal to 25.5 mm between the lens and the center of rotation of the eye of the wearer. It is desirable for there to be no Fresnel rings in this second circular zone in order to prevent any discomfort (parasitic reflections) that would be engendered thereby in the central vision of the wearer. It is known that such discomfort may be provoked by an interaction between the rings of the Fresnel layer and incident light.

Those skilled in the art of the design of ophthalmic lenses are aware of and know how to manipulate a "layer", which is a representation of a virtual surface describing a variation of a height z at each and every point of a plane referenced by its Euclidean coordinates (x, y). A layer may be added point by point to a surface borne by the face of an ophthalmic lens. The adding of a layer to another surface is also referred to as an "addition" or "superposition" and consists in summing algebraically components along their height or altitude z. The layer may take the form of a continuous function, a "continuous layer" or "continuous surface" then being spoken of, but may also comprise discontinuities along the axis D or in derivatives of D or have a discrete representation. An example of use of continuous layers is given in the international patent application filed by the Applicant and published under the reference WO2011/000845 A1.

The carrier is an example of a continuous layer.

The Fresnel layer is an example of a non-continuous layer that comprises a plurality of rings and a plurality of discontinuities along the axis D, bounding the rings. These discontinuities are inscribed in one another. Among the discontinuities, the discontinuity in which no other discontinuity is inscribed is called the "first discontinuity". Between two discontinuities figures a ring or "tooth" that has an aspherical profile.

Techniques for producing a Fresnel layer from a continuous surface are well known, one example being described in European patent application EP 2 217 962 A1 filed by the Applicant, said application relating to a curved patch intended to be fastened to a concave face of an optical component; this technique will not be recalled here but an illustrative example of a method allowing a radial profile of the Fresnel layer to be deduced from a radial profile of a continuous surface will be briefly described. This method produces a Fresnel layer the rings of which are constant in height.

A cutting height h is considered.

Below, the "height" of a point of the continuous layer designates the component along D of this point. A point M of the profile of a continuous layer is referenced by its radial distance r to the axis D. To each point M of the radial profile of the continuous layer corresponds a point M' of the radial profile of the Fresnel layer separated from the axis D by a radial distance equal to r.

To obtain a radial profile for the Fresnel layer from the radial profile of the continuous surface, the points M of the radial profile of the continuous surface are considered in turn radially outward from r=0. Provided that the height of the point M is strictly lower than the cutting height h, the height of the point M' remains equal to the height of the point M. To the point M of the continuous surface, which has a height equal to the height h, corresponds a point M' of the Fresnel layer the height of which is set to 0: this is the first discontinuity. For points at greater radial distances on the radial profile of the continuous surface, the height of the point M' follows the same variations as that of the height of the point M until the height of the point M reaches an integer multiple of the cutting height h. At the radial distance at which this occurs, the height of the corresponding point M' is again set to 0, this is the second discontinuity.

Thus, the radial profile of the Fresnel layer comprises, at the scale of the representation in FIG. 1b, a succession of "teeth" bounded by discontinuities along the axis D, also called "jumps", and embodied by a height difference between two points: the first of which has a height equal to the cutting height, and the second of which has a height of zero. Between two discontinuities, the radial profile of the Fresnel layer varies in the same way as the radial profile of the continuous layer. In particular, the radial profile of the Fresnel layer comprises locally the same variations in curvature as the radial profile of the continuous layer.

The "teeth" of the radial profile of the Fresnel layer correspond to what are referred to as "Fresnel" rings in the Fresnel layer. The radial profile of the continuous surface is aspherical, just like the radial profile of each of the teeth of the Fresnel layer. Rings of aspherical profile will therefore also be spoken of.

In one embodiment of the lens according to the invention, the first profile of curvature of the carrier has a first constant curvature and said second profile of curvature of the carrier has a second curvature different from the first curvature at least locally at one point. However, all the points of the face, and even those that are located outside of the first central zone, have, on account of the addition of the Fresnel layer and the carrier, a constant curvature equal to said first curvature. The profile of the Fresnel teeth compensates locally for the difference between the first and second curvatures so that overall the curvature measured at any point on the face resulting from the superposition of the carrier and the Fresnel layer is constant and equal to the first curvature.

Figure 2:
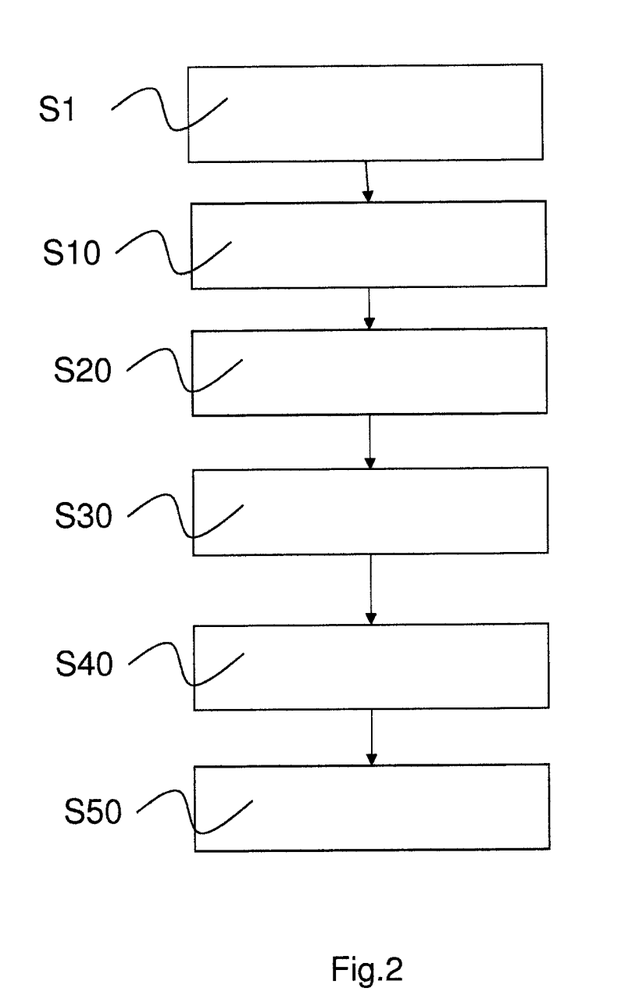
FIG. 2 shows a flowchart of a method for defining one face of an ophthalmic lens according to an embodiment of the invention.

FIG. 2 shows a flowchart of a method for defining one face of an ophthalmic lens, which comprises in succession 6 steps S1, S10, S20, S30, S40 and S50.

As a starting point, a face of an ophthalmic lens similar to that shown in FIG. 1a is considered. The face has a circular shape and is bounded by a circular edge of radius R and comprises a carrier comprising a first central zone and a peripheral annular zone. The first central zone is bounded by a first circular boundary, and the peripheral zone is bounded on the one hand by a second circular boundary and on the other hand by the edge of the face. The carrier is axisymmetric about an axis (D) normal to the carrier and passing through the geometric center of the carrier. The first central zone and the annular peripheral zone are axisymmetric about the same axis.

Step S1 consists in defining the radial profiles of curvature of the first central zone and of the peripheral zone, said profiles being referred to as the first and second profile, respectively.

The central zone 10 conventionally provides a power correction that is prescribed by a prescription. Its profile of curvature is given. For example, the first profile has a constant curvature the value of which is directly related to the prescription.

The second profile is defined independently of the first profile. For example, it is chosen so that the curvature at the edge of the face is substantially equal to the curvature of a spectacle frame in which the lens must be fitted. For example, the second profile has a constant curvature the value of which is directly related to the curvature of the frame.

The first and second profiles may respectively have a constant curvature or a complex but continuous variation along the axis r.

Step S10 consists in defining a first radius R1 for the first boundary and a second radius R2 for the second boundary.

The value defined for the radius R1 will be between 10 and 15 mm so that a Fresnel layer s, of which more will be said below and which is especially defined from the profile of the carrier and intended to be superposed on the carrier, is devoid of rings in a second central zone of radius larger than or equal to 15 mm.

The definition of the second radius R2 allows a transitional zone that is contiguous to the first central zone and the peripheral zone to be delimited. The greater the difference between the second radius R2 and the first radius, the less the profile of curvature in the transitional zone is constrained.

The second radius is for example defined depending on the shape of the frame.

The second radius is for example defined depending on temporal capacity.

Specifically, the second radius corresponds to the distance separating the geometric center from the zone the curvature of which is matched to the curvature of the frame. Temporal capacity corresponds to the distance separating the center of the face and the edge of the lens on the temporal side (i.e. the side of the temple of the wearer), that is to say the location where the frame will be found. It is therefore advantageous for the temporal capacity to be at least larger than the second radius.

Step S20 consists in defining a third profile of curvature for this transitional zone.

Advantageously, the third profile of curvature is defined so that the carrier has a representation that is continuously derivable up to the 4th order.

Advantageously, the third profile of curvature is described by a 3rd-order polynomial equation as a function of the distance to the geometric center. Step S20 is carried out using a computer. It for example consists in defining a profile of curvature that is matched to the curvature of the first profile in the vicinity of R1 and that is matched to the curvature of the second profile in the vicinity of R2 in order to provide, in a digital format, a complete profile of curvature for the carrier, which profile is defined in sections in the first central zone, the transitional zone and the peripheral zone.

Advantageously step S10 and step S20 may be carried out simultaneously in order to define, optimally, the first and second radii and the third profile.

Step S30 consists in defining a target profile of curvature for the face, said target profile of curvature being identical in said first central zone to the first profile of curvature of the carrier. Step S30 is carried out using a computer and for example consists in defining a target profile of curvature in a digital format.

This target profile of curvature is the profile that it is desired to measure on the points of the face. The target profile may be aspherical or completely spherical.

Advantageously, the target profile of curvature of the face is axisymmetric about the axis D.

Advantageously, the target profile of curvature of the face is aspherical.

Advantageously, the target profile of curvature of the face has a representation that is continuously derivable up to the 4th order.

Step S40 consists in defining a profile of curvature for the Fresnel layer on the basis of a difference between said target profile of curvature and said complete profile of curvature of the carrier.

The target profile of curvature and the complete profile of curvature of the carrier, which by construction each have a representation that is continuously derivable up to the 4th order, are known. Step S40 is for example carried out using a computer. S40 for example especially consists in obtaining in a digital form the difference between the target profile of curvature and the complete profile of curvature of the carrier. Thus, a radial profile is constructed for a continuous surface having an axial symmetry (not shown in the figures) about an axis of symmetry D passing through the geometric center of the face and normal to the carrier.

Step S50 consists in defining a Fresnel layer by cutting the continuous profile of curvature obtained in step S40. When the continuous profile of curvature is aspherical, the same goes for the Fresnel layer which is then designated an "aspherical Fresnel layer".

In the context of step S50, a constraint is placed on the absence of rings in the Fresnel layer inside a second circular central zone that is centered on the geometric center and that has a radius R3 larger than 15 mm. In this way, the wearer is guaranteed not to experience any visual discomfort. The fact that, by construction, the radial profile of the continuous surface has a curvature of zero in the first central zone makes this constraint easier to satisfy.

The carrier and the Fresnel layer thus defined may be machined in a single operation by direct machining of the face of the lens.

Advantageously, the first profile of curvature of the carrier has a first constant curvature in the first central zone, and the target profile of curvature of the face has a constant curvature in the first central zone, the transitional zone and the peripheral zone, which curvature is equal to said first curvature; in other words, the target profile of curvature has a constant curvature equal to said first curvature.

Advantageously, the first profile of curvature of the carrier has a first constant curvature in the first central zone, said second profile of curvature of the carrier has a second constant curvature in the peripheral zone and the target profile of curvature of the face has a constant curvature in the peripheral zone.

The method described above may be implemented to produce the four aforementioned advantageous example lenses. The following table collates the particular parameters used in the method according to the invention to produce the 4 example ophthalmic lenses.

|  |  | 1st advantageous embodiment | 2nd advantageous embodiment | 3rd advantageous embodiment | 4th advantageous embodiment |
|---|---|---|---|---|---|
| Carrier surface | | Front face | Front face | Front face | Back face |
| Carrier curvature | central zone | Base 8 | Base 13 | Base 4 | Base 10 |
|  | peripheral zone | Base 4 | Base 4 | Base 8 | Base 4 |
|  | transitional zone | Profile shape: 3rd order polynomial in r | Profile shape: 3rd order polynomial in r | Profile shape: 3rd order polynomial in r | Profile shape: 3rd order polynomial in r |
| Zonal breakdown | R1 | 10 mm | 7 mm | 10 mm | 10 mm |
|  | R2 | 25 mm | 30 mm | 30 mm | 25 mm |
| Target of the face | | Front face | Front face | Front face | Back face |
| Target curvature for the face | central zone | Constant curvature base 8 | Base 13 | Constant curvature base 4 | Constant curvature base 10 |
|  | peripheral zone | | Base 8 | | |
|  | transitional zone | | 3rd order polynomial in r | | |

In the foregoing, the expression "one embodiment" is understood to mean that a particular feature, the structure, or a feature described in relation to the embodiment may be included in at least one embodiment of the invention. The instances of the expression "in one embodiment" at various places in the foregoing detailed description do not necessarily all refer to the same embodiment. Likewise, distinct or alternative embodiments are not necessarily mutually exclusive of other embodiments.

The invention claimed is:

1. A method for defining one face of an ophthalmic lens, the face having a surface formed by superposing a Fresnel layer and a continuous surface referred to as a carrier, the carrier comprising a geometric center, a first central zone and an annular peripheral zone, the carrier being axisymmetric, the Fresnel layer, the first central zone and the peripheral zone being centered on the geometric center of the carrier, the first central zone being bounded by a first circular boundary, the annular peripheral zone being bounded on the one hand by a second circular boundary and on the other hand by a edge of the face, the method being implemented by a computer and comprising:

defining a first profile of curvature for the carrier in the first central zone and a second profile of curvature for the carrier in the annular peripheral zone, the first profile of curvature depending on prescription constraints and the second profile of curvature depending on curvature constraints of a frame;

defining a first radius for a first boundary and a second radius for a second boundary, the first radius being between 10 and 15 mm and the second radius depending on a shape of the frame and/or a temporal capacity corresponding to a distance separating the geometric center of the face and an edge of a lens temporal side;

defining a third profile of curvature for a transitional zone of the carrier, the transitional zone being contiguous to the first central zone and to the annular peripheral zone, and defining a complete profile of curvature for the carrier, comprising the first, second and third profile of curvatures of the carrier;

defining a target profile of curvature for the face, the target profile of curvature being identical in the first central zone to the first profile of curvature of the carrier;

defining a continuous profile of curvature on the basis of a difference between the target profile of curvature and the complete profile of curvature of the carrier;

defining the Fresnel layer by cutting the continuous profile of curvature; and forming the face of the ophthalmic lens.

2. The method according to claim 1, wherein
the first profile of curvature of the carrier has a first constant curvature in the first central zone, and
the target profile of curvature of the face has a constant curvature in the first central zone, the transitional zone and the peripheral zone, in which the constant curvature is equal to the first curvature.

3. The method according to claim 1, wherein
the first profile of curvature of the carrier has a first constant curvature in the first central zone, the second profile of curvature of the carrier has a second constant curvature in the peripheral zone, and
the target profile of curvature of the face has a constant curvature in the peripheral zone.

4. The method according to claim 1, wherein the Fresnel layer comprises a plurality of rings centered on the geometric center, each ring being defined on the basis of the continuous profile of curvature and of a given ring height, the ring height being defined so that the Fresnel layer is devoid of rings in a circular second central zone centered on the geometric center and of radius larger than or equal to 15 mm.

5. The method according to claim 1, wherein
the third profile of curvature is defined so that the complete profile of curvature of the carrier has a representation that is continuously derivable up to a 4th order, and
the target profile of curvature of the face has a representation that is continuously derivable up to the 4th order.

6. The method according to claim 5, wherein the third profile of curvature is described by a 3rd- order polynomial equation as a function of a radial distance to the geometric center.

7. The method according to claim 1, wherein the second radius is defined so that a value of the second radius is lower than a value of the temporal capacity of the ophthalmic lens.

* * * * *